United States Patent Office 3,114,773
Patented Dec. 17, 1963

3,114,773
PROCESS FOR PRODUCING CHLOROACETONE
William F. Brill, Skillman, N.J., assignor to Petro-Tex Chemical Corporation, Houston, Tex., a corporation of Delaware
No Drawing. Filed May 20, 1960, Ser. No. 30,426
4 Claims. (Cl. 260—593)

This invention relates to oxidation of halogen-containing olefinic materials. More particularly, it relates to the production of aliphatic α-halocarbonyl compounds from halogen-containing mono-olefinic compounds by the oxidation of the halogen-containing mono-olefinic compounds in the liquid phase.

It is an object of the present invention to provide a useful and improved method for the preparation of aliphatic α-halocarbonyl compounds. It is a further object of this invention to provide a method for the preparation of aliphatic α-halocarbonyl compounds from halogen-containing olefins. These and other objects will be apparent from the description which follows.

I have unexpectedly found that α-halocarbonyl compounds of the general formula

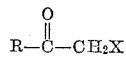

may be produced from olefinic compounds of the general formula

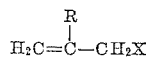

wherein R is selected from the group consisting of —H and —CH₃; X is selected from the group consisting of Cl, Br, and I. The defined α-halocarbonyl compounds may be prepared in accordance with this invention from the corresponding halogen-containing mono-olefin by oxidation of the halogen containing mono-olefin in the liquid phase with oxygen.

It would have been expected that the oxidation of the halogen-containing olefins would have formed peroxides and that these peroxides would catalyze the olefinic compounds to dimers and other products. Furthermore, in view of the ethylenic unsaturation of the halogen-containing olefinic materials, it might have been expected that fission of the double bonds with the production of carboxylic acids of lower molecular weight might take precedence over the formation of the carbonyl compounds.

The α-halocarbonyl compounds of this invention are produced by a process whereby halogen-containing olefins are oxidized in the liquid phase with oxygen. For example, chloroacetaldehyde is produced by the oxidation of allyl chloride in the liquid phase by passing oxygen therethrough. The halogen-containing olefins found useful as starting materials for preparing the defined polyhalohydrin are the allylic halides such as allyl chloride, methallyl chloride, allyl bromide, allyl iodide, methallyl bromide, methallyl iodide and the like.

The oxidations are conducted in the liquid phase at either subatmospheric, atmospheric or above atmospheric pressure. The pressure employed is generally from about atmospheric to about 500 p.s.i. or higher, with a preferred pressure range of from about one atmosphere to about 300 p.s.i. When using halogen-containing compounds of relatively low boiling point such as allyl chloride it is necessary to conduct the oxidation under pressure when the temperature of oxidation is above the boiling point of the halogen containing compound.

The temperature of oxidation may be varied from about 25° C. to about 250° C. Normally the temperature range is from about 50° C. to about 200° C. and more preferably from about 70° C. to about 110° C. The choice of temperature for the reaction is primarily dependent upon the desired rate of reaction. If a slow rate of reaction is preferred, the correspondingly lower temperature may be utilized. Oxygen may be supplied to the oxidation reaction either as pure oxygen or as oxygen mixed with inert gases including nitrogen and helium. Air may be used.

The oxygen may be contacted by admixture with halogen-containing olefin in any convenient manner. The oxygen may simply be bubbled through the reaction mass, or equipment particularly adapted to gas-liquid mixing may be used. Mixers such as bubble towers, turbo-absorbers, scrubbers and devices for recirculating through towers or nozzles are useful. The gas and liquid flow may be in the same direction or counter-current.

While the reaction may be conducted without the addition of a catalyst, the rate of reaction may be increased by the use of an oxidation catalyst. These catalysts may be finely divided polyvalent metals which have an atomic number of about 22 to about 82. Compounds of metals are also useful, including the oxides, and the inorganic or organic salts. Examples of the types of catalyst that may be employed are the metals such as cobalt, vanadium, cerium, copper, manganese, silver and uranium and the combination of these metals with organic, hydrochloric, nitric or phosphoric acids. Specific examples of useful compounds are cobaltic acetylacetonate, cobaltous chloride, cobalt naphthenate, cobalt acetate, magnesium oxide, manganese acetate, barium acetate and barium butyrates. The preferred catalysts are cobalt salts, including cobaltic acetylacetonate, cobalt naphthenate, cobaltous acetate, and cobaltous chloride.

The oxidation may be promoted by the addition of alkaline earth or alkali metals or the salts thereof such as magnesium acetate. Lead and the lead salts have been found useful. The oxidation may also be promoted by addition of free radical generating compounds. Examples of these types are inorganic and organic peroxides and the azo-aliphatic-nitrile catalysts. Examples of such promoters are hydrogen peroxide, cumene hydroperoxide, tert-butyl hydroperoxide, diacetyl peroxide, sodium peroxide, peracetic acid, perbenzoic acid, potassium persulfate and 2-azo-bis-isobutyronitrile. Combinations of one or more of the catalysts or promoters may be used. The proportions of catalyst and promoters used may vary from a few parts per million based on the halogen-containing olefin up to about 20 weight percent. Generally, the concentration of the catalyst will be, on a molar basis, from about .001 to about 0.10 mole per mole of halogen-containing olefin. The concentration of the catalyst promoters will also generally be from about .001 to about 0.10 mole based on the moles of halogen-containing olefin. The catalysts and promoters may be added to the reaction initially or added during the reaction. However, it has generally been found that once the oxidation has been initiated the reaction will maintain itself.

The oxidation of the halogen-containing olefin may be conducted either in bulk or in the presence of a liquid medium which may be either a solvent or diluent for the halogen-containing olefin. The solvents or diluents should be inert to oxidation under the defined reaction conditions. Liquid media such as water, low molecular weight organic acids, saturated aliphatic hydrocarbons, benzene and carbon tetrachloride may be used. The liquid medium may be present from 1 to 99 percent by weight of the total reaction mixture or preferably from 25 to 85 percent of the total.

The oxidation process produces a mixture of products, and the desired α-halocarbonyl compounds are separated from the other constituents by conventional processes such as distillation and/or solvent extraction.

The following examples are representative embodiments of the invention. All percentages are on a weight basis unless stated otherwise. The concentrations of catalysts and "added ingredients" are based on the weight of the halogen-containing olefinic material. In the following examples all of the halogen-containing olefins were purified by fractionation before use. Oxidations at atmospheric pressure were conducted in a magnetically stirred vessel, using U.S.P. cylinder oxygen. For pressure oxidations, a 1.4 liter stirred stainless steel autoclave was used. The reactors were cooled to remove the exothermic heat of reaction.

*Example 1*

At 200 p.s.i., 487.1 g. (5.37 moles) of methallyl chloride containing 20 g. (0.5 mole) of light magnesium oxide (crystalline magnesium oxide obtained by heating the carbonate) and 4.8 g. (0.053 mole) of ter-butyl hydroperoxide was oxidized at 100° C. by bubbling oxygen therethrough with an off gas of 0.21/min. The reaction slowed and was terminated at 375 minutes after the consumption of 3.55 moles of oxygen. The liquid oxidation product weighed 510 g. The desired chloroacetone constituted 24 percent of the product. The reaction product also contained 1,3-dichloro-2 methyl propanol-2.

*Example 2*

One mole (90.6 g.) of methallyl chloride containing 0.005 mole (1.8 g.) of cobaltic acetylacetonate and 0.02 mole (5.0 g.) of cumene hydroperoxide was oxidized at 60° C. by bubbling oxygen through the methallyl chloride. Consumption of oxygen after 6 hours showed a constant rate at $9.7 \times 10^{-7}$ moles $O_2$/mole olefin/sec. Total oxygen consumed was 0.22 mole. The product 1-chloroacetone was obtained by fractionation of the liquid reaction product.

*Example 3*

6.5 moles (497.3 g.) of allyl chloride containing 0.5 mole (20.0 g.) of light magnesium oxide was oxidized by passing oxygen through the allyl chloride. The oxidation was conducted at 200 p.s.i. and 100° C. for 440 minutes and 2.4 moles (76.8 g.) of oxygen was consumed. Consumption of oxygen began in 120 minutes and a constant maximum rate of $2.5 \times 10^{-5}$ moles $O_2$/mole olefin/sec. was reached in approximately 260 minutes. Chloroacetaldehyde (distillate 41–43° C./50 mm., residence time 2.7 min.) was identified by its spectra and recovered. 1,3-dichloropropanol was also produced by the reaction.

The α-halocarbonyl compounds produced by this invention have a variety of uses such as for solvents, insecticides and as intermediates in chemical synthesis. For example, chloroacetaldehyde is useful in the preparation of mono-alkyl ketones of the formula $RCO\ CH_2OH$ by reacting chloroacetaldehyde with a Grignard reagent, followed by oxidation of the secondary alcohol group with a chromic acid mixture and the replacement of the chlorine through the formate.

While the invention has been described in detail and preferred embodiments have been given, it is understood that various changes may be made and equivalent ingredients substituted without departing from the scope of the invention.

I claim:

1. A process for the preparation of chloroacetone which comprises admixing in liquid phase at a pressure from about atmospheric pressure to about 300 p.s.i. and at a temperature of from about 50° C. to 200° C. methallyl chloride with oxygen in the presence of an oxidation catalyst selected from the group consisting of cobaltic acetylacetonate, cobaltous chloride, cobalt naphthanate, cobalt acetate, magnesium oxide, manganese acetate, barium acetate and barium butyrates and in the presence of a promoter selected from the group consisting of hydrogen peroxide, cumene hydroperoxide, tert-butyl hydroperoxide, diacetyl peroxide, sodium peroxide, peracetic acid, perbenzoic acid, potassium persulfate, 2-azobis-isobutyronitrile and mixtures thereof.

2. A process for the preparation of chloroacetone which comprises oxidizing a composition comprising from 15 to 75 percent by weight of methallyl chloride, 25 to 85 percent by weight of an inert liquid medium, .001 to about 0.10 mole based on the moles of methallyl chloride of a cobalt oxidation catalyst, .001 to about 0.10 mole based on the moles of methallyl chloride of a peroxide free radical generating promoter for the oxidation, with oxygen at a temperature of about 70° C. to about 110° C. and at a pressure from one atmosphere to 300 p.s.i.

3. A process for the preparation of chloroacetone which comprises admixing in liquid phase at a pressure from about atmospheric pressure to about 300 p.s.i. and at a temperature of from about 50° C. to 200° C. methallyl chloride, oxygen, magnesium oxide and tert-butyl hydroperoxide.

4. A process for the preparation of chloroacetone which comprises admixing in liquid phase at a pressure from about atmospheric pressure to about 300 p.s.i. and at a temperature of from about 50° C. to 200° C. methallyl chloride, with oxygen in the presence of cobaltic acetylacetonate and cumene hydroperoxide.

References Cited in the file of this patent

UNITED STATES PATENTS

| | | |
|---|---|---|
| 2,316,604 | Loder et al. | Apr. 13, 1943 |
| 2,369,182 | Rust et al. | Feb. 13, 1945 |
| 2,974,161 | Keith et al. | Mar. 7, 1961 |